(12) United States Patent
Harnois et al.

(10) Patent No.: US 7,684,386 B2
(45) Date of Patent: Mar. 23, 2010

(54) APPARATUS AND METHOD FOR COMMUNICATIONS CONTROL

(75) Inventors: Martin Harnois, Temecula, CA (US); Robert Painter, San Diego, CA (US); Jeff Wittek, Temecula, CA (US)

(73) Assignee: Plant Equipment, Inc., Temecula, CA (US)

(*) Notice: Subject to any disclaimer, the term of this patent is extended or adjusted under 35 U.S.C. 154(b) by 1466 days.

(21) Appl. No.: 11/038,587

(22) Filed: Jan. 18, 2005

(65) Prior Publication Data

US 2006/0159064 A1 Jul. 20, 2006

(51) Int. Cl.
*H04L 12/26* (2006.01)

(52) U.S. Cl. .................. 370/352; 361/42; 370/498; 379/377

(58) Field of Classification Search .......... 370/235, 370/261, 352, 389, 498; 379/201.01, 205.05, 379/201.07, 220.01, 265.09, 377; 705/7; 709/202; 361/42
See application file for complete search history.

(56) References Cited

U.S. PATENT DOCUMENTS

| | | | | |
|---|---|---|---|---|
| 5,822,418 A | * | 10/1998 | Yacenda et al. | 379/201.07 |
| 5,875,242 A | * | 2/1999 | Glaser et al. | 379/201.05 |
| 6,078,593 A | * | 6/2000 | Eames et al. | 370/498 |
| 6,094,479 A | * | 7/2000 | Lindeberg et al. | 379/220.01 |
| 6,188,688 B1 | * | 2/2001 | Buskirk, Jr. | 370/389 |
| 6,574,333 B1 | * | 6/2003 | Manchester et al. | 379/377 |
| 6,762,917 B1 | * | 7/2004 | Verbiest et al. | 361/42 |
| 6,870,915 B2 | * | 3/2005 | Stillman et al. | 379/201.01 |
| 7,319,692 B2 | * | 1/2008 | Boyle et al. | 370/352 |
| 7,353,180 B1 | * | 4/2008 | Silverstone et al. | 705/7 |
| 2002/0114278 A1 | * | 8/2002 | Coussement | 370/235 |
| 2003/0035381 A1 | * | 2/2003 | Chen et al. | 370/261 |
| 2004/0057569 A1 | * | 3/2004 | Busey et al. | 379/265.09 |
| 2008/0222240 A1 | * | 9/2008 | Deryugin et al. | 709/202 |

* cited by examiner

*Primary Examiner*—Gerald Gauthier
(74) *Attorney, Agent, or Firm*—Knobbe Martens Olson & Bear LLP (57) ABSTRACT

An apparatus and method for controlling telecommunications is provided. The apparatus, which in one embodiment is a switch, may be connected between a computer-telephony integrated (CTI) workstation and multiple communication lines to elements such as Central Offices. The switch may be manipulated either manually or by the CTI workstation to connect to one of the multiple communication lines.

18 Claims, 7 Drawing Sheets

| Signal | Pin # |
|--------|-------|
| Tip | 4 |
| Ring | 3 |
| V+ | 6 |
| V- | 1 |

APPARATUS AND METHOD FOR COMMUNICATIONS CONTROL

BACKGROUND OF THE INVENTION

1. Field of the Invention

This invention generally relates to the field of telecommunications control, whereby a communication device may be connected to a selected one of a plurality of communication lines, which may each be coupled to different Central Offices.

2. Description of the Related Art

In general, telecommunications control involves computer-telephony integration (CTI), which is the integration of computer and telephone systems. For example, CTI systems enable computers to know about and control telephony functions, such as making and receiving voice, fax, and data calls, telephone directory services, and caller identification. CTI systems provide enhanced capability and flexibility to pass data from a telephone network to a workstation for the purposes of obtaining data and properly routing telephone calls. CTI systems provide an important interconnection between voice and data in order to ensure more efficient and increased communication.

CTI was first commercialized in the 1970's to provide remote control of private branch exchange (PBX) systems for mainframe computers. Then, in the 1990s, personal computer technology was integrated into CTI devices, thereby providing accessible solutions for telecommunications. Now, CTI devices provide many different functions and a better way to interface with several types of communication. For example, a CTI device may provide a platform that allows quick deployment for flexible telephone services, such as call control, media processing, and customer data management.

To provide these services, a CTI system typically includes several components: a switch, a switch-to-CTI interface, an application programming interface (API), and a CTI application. The switch provides an interface between an incoming communication line and a destination communication line where an incoming call may be routed. The switch-to-CTI interface provides connection between the switch and a CTI server. The API allows a software developer to create new functions/services for the CTI system. The CTI application operates on one or more of the computing devices in the CTI system and enables users to manage the telephony and computing resources.

Traditionally, telecommunication networks provided intelligence within switches by way of circuits within the switch. These types of switches are not flexible enough to provide the expanding services in an efficient manner as demanded by modern CTI systems. Thus, there is a need for a switch that is better able to communicate and interface with a CTI system, such as a switch and switch-to-CTI interface that allows a CTI station to programmatically control the switch.

SUMMARY OF THE INVENTION

An apparatus and method for controlling telecommunications is provided. Embodiments of the invention provide the ability to connect a communication device to one of multiple Central Offices. This adds flexibility by combining the expanding services of a CTI system with the ability to communicate with at least one of a multitude of Central Offices coupled to the CTI system. A Central Office is defined by a broadest sense of its ordinary meaning, including but not limited to a common carrier switching center in which trunks and loops are terminated and switched. A Central Office is also known as an exchange or switching center. For example, an improved 911 emergency call center utilizing an embodiment of the invention benefits from having more than one path to receive emergency calls without increasing the number of required communication devices.

In the apparatus and methods disclosed herein, a CTI device may communicate with the switch, which programmatically couples the CTI system to a selected one of multiple Central Offices. Moreover, the switch is configured to allow manual control. By way of either manual or CTI control, the switch is designed to allow connection of at least one communication device to at least one of multiple Central Offices.

In one embodiment, a CTI system for selectively allowing communication of a workstation with one of a plurality of Central Offices is provided, the CTI system comprising a one or more workstations, a switch coupled to the workstations and to the plurality of Central Offices, wherein the switch is configured to provide a connection between one of the CTI workstations and a selected one of the plurality of Central Offices in response to a command from a CTI workstation.

In another embodiment, a method of controlling communication within a CTI system is disclosed, comprising receiving a request within the CTI system for connection to a particular Central Office selected from among a plurality of Central Offices, transmitting a command from the CTI system to a switch, wherein the command indicates the particular Central Office, and providing a connection between the CTI system and the particular Central Office through the switch in response to the command from the CTI system.

In another embodiment, a switch for directing communication within a computer-telephony integration system is disclosed, comprising a plurality of first connectors, each configured to connect to a separate Central Office, a second connector configured to connect to a communication line, a power receptacle, and a control port configured to connect to a workstation, wherein the workstation controls the switch by communicating through the control port, and wherein the switch is configured to connect the communication line to a selected one of the plurality Central Offices in response to a command sent to the switch by the workstation.

In another embodiment, an apparatus for controlling communication within a CTI system is disclosed, comprising, means for receiving a request in the CTI system for connection to a particular Central Office selected from among a plurality of Central Offices, means for transmitting a command from the CTI system to a switch, wherein the command indicates the particular Central Office, and means for providing a connection between the CTI system and the particular Central Office through the switch in response to the command from the CTI system.

In another embodiment, a method of controlling communication within a CTI system is disclosed, comprising receiving a request transmitted through a communication line coupled to the CTI system, wherein the request is for connection to one Central Office selected from among a plurality of Central Offices coupled to the CTI system, transmitting a command from the CTI system to a switch through a universal serial bus, wherein the command indicates the request for connection to the one Central Office, providing a connection between the CTI system and the one Central Office through the switch in response to the command from the CTI system, and sending a communication report from the switch to the CTI system through the universal serial bus, wherein the communication report comprises a status report of the connection between the CTI system and the one Central Office.

In an exemplary embodiment, a switch is connected to a workstation and multiple communication lines. The switch may be manipulated either manually or by the workstation to allow connection of a communication device to one of the multiple communication lines. In one embodiment, the switch may be connected via a universal serial bus (USB) to a CTI workstation. This CTI workstation may be a VESTA DMS manufactured by and commercially available from Plant Equipment, Inc., or any other workstation that provides local exchange capabilities for call-centers and other Central Offices. Central office services may be provisioned on a DMS-100 Meridian Digital Centrex (MDC) circuit, delivered by the local exchange carrier (LEC). In one embodiment, the switch is configured to allow the workstation to switch between multiple Central Offices, connecting the CTI workstation to the selected Central Office. The switch may also be manually manipulated by a user to select the desired Central Office. The switch and CTI workstation may also provide other functionalities, including, but not limited to, monitoring, reporting and updating the communication system.

These and other objects and features of the invention will become more fully apparent from the following description and appended claims taken in conjunction with the following drawings, where like reference numbers indicate identical or functionally similar elements.

DETAILED DESCRIPTION OF EMBODIMENTS OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

Figure 1:
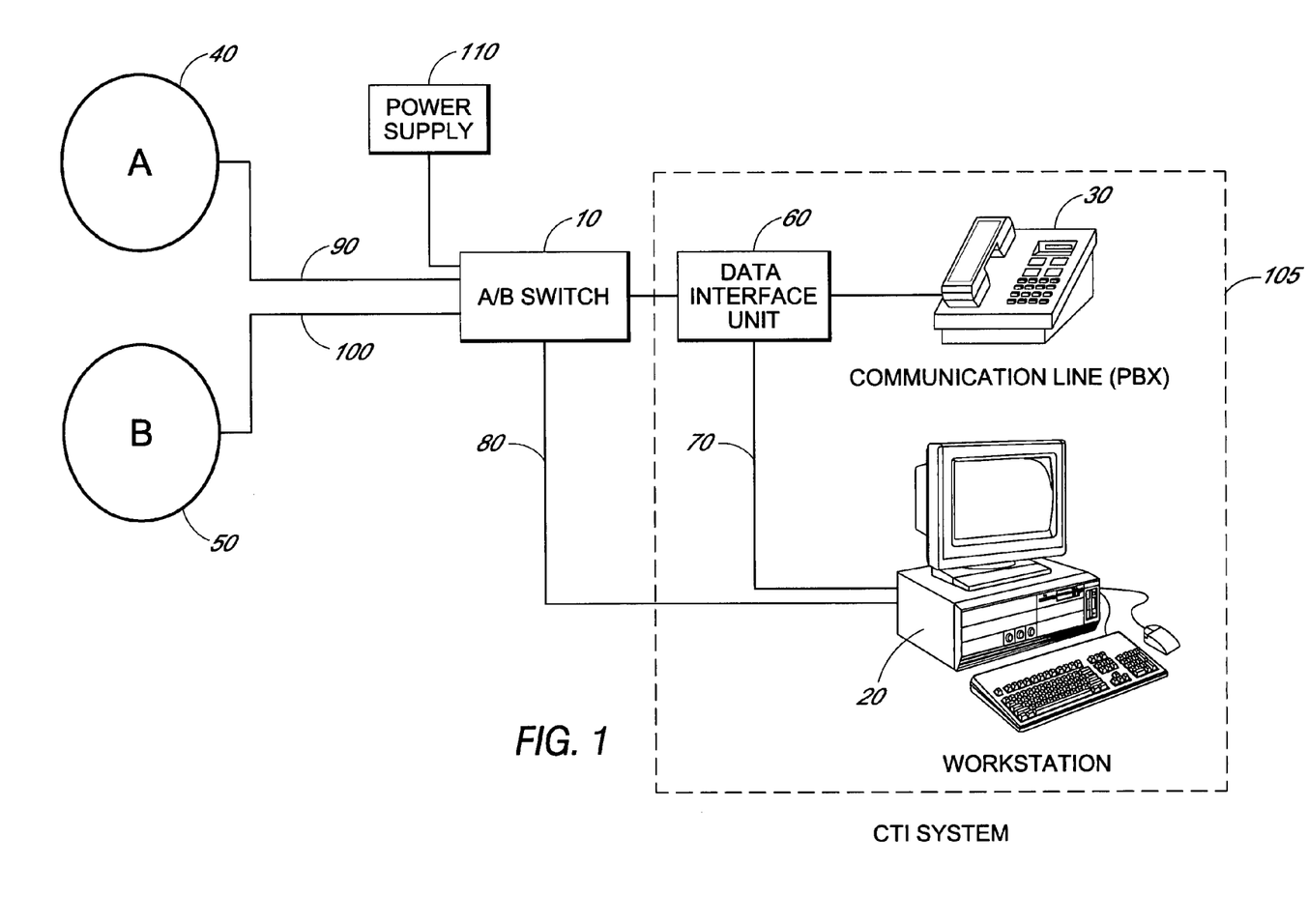
FIG. 1 is a block diagram illustrating components of an exemplary communication system.

A block diagram illustrating components of an exemplary communication system is provided in FIG. 1. In the exemplary communication system, a switch 10 is either operated by a CTI system 105, which is electronically coupled to the switch 10, or is operated manually by a user. In the embodiment of FIG. 1, the switch is electronically coupled to a workstation 20 within the CTI system 105, such that communication between the switch 10 and the workstation 20 travels on a communication line 80. In one embodiment, communication line 80 is a universal serial bus (USB) that facilitates USB communication between the switch 10 and the workstation 20. In one embodiment, communication line 80 is a standard USB peripheral interface which includes circuitry and firmware allowing it to communicate with a compliant USB host such as a Microsoft Windows workstation.

Also coupled to the switch 10 is a data interface unit 60 that is part of the CTI system 105. The data interface unit 60 is also coupled to the workstation 20 via a communication line 70. The data interface unit is also coupled to another communication device 30 within the CTI system 105, such as a telephone as depicted in FIG. 1. Although this communication device 30 is illustrated as comprising a telephone, it may alternatively be any type of communication device. Moreover, in alternative embodiments, the data interface unit 60 may be eliminated. With an alternative communication device 30, it is possible that the data interface unit 60 would not be installed and instead the communication device 30 would connect directly to the switch 10.

In other alternative embodiments, the switch may integrate multiple data interface units 60, thereby providing the ability to connect a selected Central Office A 40 or B 50 to one of a plurality of communication lines 30, such as multiple communication lines within a PBX network. Moreover, in alternative embodiments, the switch 10 may be connected to more than two Central Offices. Thus, a skilled technologist would be able to fabricate a switch 10 that connects to a multitude of Central Offices other than the Central Offices A 40 and B 50 and that connects to a multitude of other communication devices other than communication device 30.

The switch 10 is also connected to communication lines 90 and 100 that are located outside the CTI system 105. In FIG. 1, these communication lines 90 and 100 are each connected to a separate Central Office, such as Central Office A 40 or Central Office B 50. Finally, the switch 10 is connected to a power supply 110, such as a 24 Volt Direct-Current (VDC), for example. The power supply 110 alternatively may comprise any of the numerous well known and commercially available power supplies that find application for this type of use.

In the exemplary embodiment illustrated in FIG. 1, the CTI system 105 may be any form of a communication system where connection to one of a multitude of communication lines 90 and 100 or Central Offices 40 and 50 is desirable. For example, in a 911 emergency call center, receiving calls from an alternate Central Office may be desirable. With the communication system of FIG. 1, the CTI system 105 and switch 10 are coupled and configured to provide a communication path between the switch 10 and the workstation 20 via communication line 80. The workstation 20 may then programmatically control the switch 10, thereby providing a communication path between the CTI system 105 to one of the Central Offices 40 and 50 through the corresponding communication lines 90 and 100 that are coupled to the switch 10. This communication path to one of the Central Offices 40 and 50 may travel through the switch 10 into the CTI system 105 arriving at the communication device 30 through the data interface unit 60 that is coupled to both the switch 10 and the communication device 30. In addition to programmatic control by the CTI system 105, the switch 10 also provides a way for a user to manually select a communication path.

Figure 2:
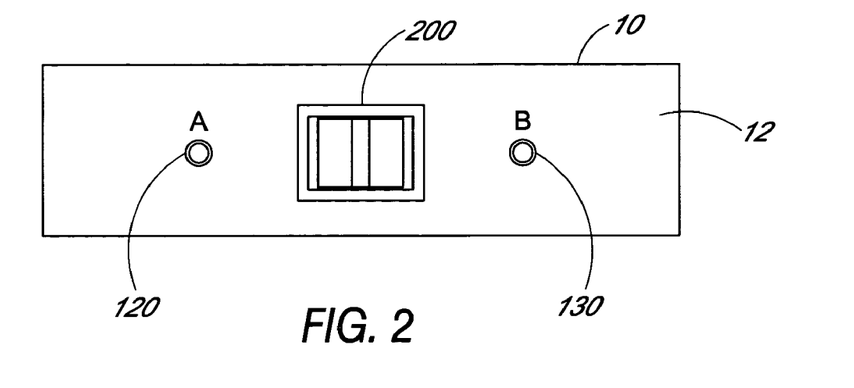
FIG. 2 is a front view of an embodiment of a switch.

FIG. 2 is a front view of an embodiment of the switch 10. The front of this switch embodiment comprises a front panel 12 upon which is located a toggle switch 200 that allows manual selection of an output signal from two or more input signals. For example, the toggle switch 200 may be configured to provide connection to a first communication line when pushed to the left of center and to a second communication line when pushed to the right of center. The first and second communication lines may correspond to the communication lines 90 and 100 illustrated in FIG. 1. Thus, the switch 10 controls whether Central Office A 40 or Central Office B 50 is coupled to the CTI system 105. As described above, the switch 10 may also be controlled by a CTI device, such as the workstation 20. The toggle switch 200 may be configured to allow control of the switch 10 by a workstation when the toggle switch 200 is in a center position. Also, as depicted in FIG. 2, the front panel 12 of the switch 10 may comprise a set of indicators 120 and 130, such as light emitting diodes (LEDs), that indicate which communication line is active or selected.

Described below is an embodiment of FIG. 1, with reference to FIG. 2, using exemplary proprietary components. The following description is for illustrative purposes only and is not intended to limit the scope and methods described herein. In one embodiment, the system may include two Central Offices 40 and 50, which may each be a DMS-100. Each of these Central Offices 40 and 50 is connected via a separate Meridian Digital Centrex communication line 90 and 100 to the switch 10. The switch 10 is connected to a VESTA workstation 20, such as the VESTA DMS-100, via a USB 80, and a data interface unit 60 that is connected to a local Meridian Business Set communication system 30. The data interface unit 60 is also connected to the VESTA workstation 20. The switch 10 is powered via a local 24VDC power supply 110 or a power supply provided by the USB connection 80. In this configuration, the switch 10 is operated either by the VESTA workstation 20 or manually through the toggle switch 200. The switch 10 is therefore computer-telephony integrated, allowing the VESTA workstation 20 to manipulate the switch 10 in order to affirmatively communicate with one of the Central Offices 40 or 50. The VESTA workstation 20 may then connect the Meridian Business Set 30 to either of the Central Office lines 40 or 50.

Figure 3:
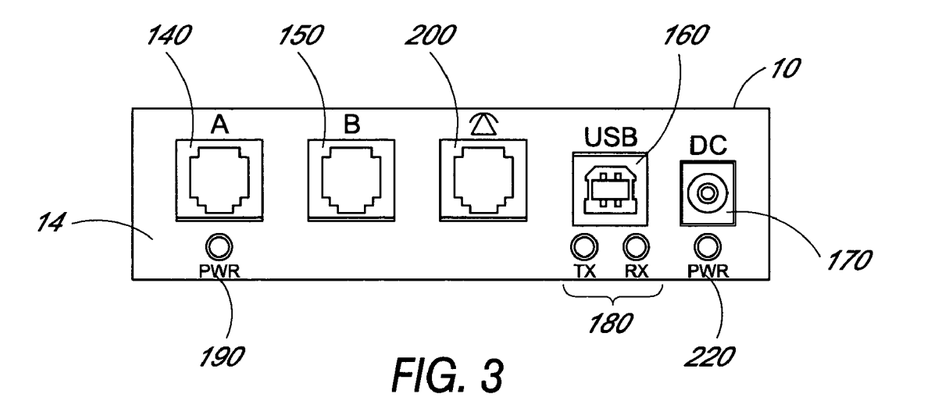
FIG. 3 is a back view of an embodiment of a switch.

FIG. 3 illustrates the back panel 14 of an embodiment of the switch 10. Back panel 14 comprises two separate communication receptacles 140 and 150 for connection of the switch 10 with communication lines, such as the communication lines 90 and 100 that connect to Central Office A 40 or Central Office B 50 from FIG. 1. In one embodiment, the two separate receptacles 140 and 150 are 6-wire modular jacks. Back panel 14 also comprises a switch/workstation communication receptacle 160, which may be a USB port as depicted in FIG. 3, or it may be any other type of communication receptacle that facilitates communication between the switch 10 and the workstation 20. Back panel 14 also comprises a power receptacle 170, which may provide for coupling to a 24VDC, for example, or any other power supply, and a series of LEDs 180, 190 and 220 indicating power transmission and communication activity between the switch 10 and workstation 20. In one alternative embodiment, the back panel 14 has only one LED 180 to indicate communication at the communication receptacle 160, which may be a USB port. Finally, the back panel 14 comprises a third communication receptacle 200 for communication with the communication device 30 depicted in FIG. 1, which may be a telephone, an entire PBX system or another communication device. Although various components have been described as being located on the back panel 14 in the embodiment of FIG. 3, it will be appreciated that these components may be located at other locations on the switch 10 or at other locations so as to be in communication with the switch 10.

In one embodiment, the switch/workstation receptacle 160 in FIG. 3 is a series B USB receptacle that allows for use of a standard detachable USB cable (not depicted). In this embodiment and with reference to FIG. 1, the USB detachable cable connects the switch 10 to the workstation 20 or to a USB hub (not depicted), which is connected to the workstation 20. However, USB is not necessary to communicate between the switch 10 and workstation 20. There are many different ways to communicate between the elements of this communication system. As long as the elements are able to communicate with one another and perform their functions, then the communication system will perform its desired functions.

If the switch/workstation receptacle 160 is a USB receptacle and connected to a self-powered USB hub, the switch 10 may receive its power through the USB. This is not required, however, if the switch 10 is also connected to a DC power supply 110 at the power receptacle 170. For the switch 10 to function, it needs to be powered; thus, providing the redundancy of multiple power supplies is helpful. Other embodiments of the power receptacle 170 may include locking features to prevent accidental disconnections.

Also, if the switch/workstation receptacle 160 is a USB receptacle, a USB protocol preferably comprises a hardware version, a firmware version, and a protocol version embedded in a product version ID field of a USB device descriptor. The 16-bit product version ID preferably contains bits 15-12 for the hardware version, bits 11-4 for the firmware version, and bits 3-0 for the protocol version.

As for the series of LEDs 180, 190 and 220 illustrated on the back panel in FIG. 3, one LED 220 indicates that the switch 10 is properly powered, a pair of LEDs 180 indicate whether information is being received or sent to the workstation 20, and the remaining LED 190 indicates whether the DC power supply flowing through communication line 140 is functioning.

Figure 4:
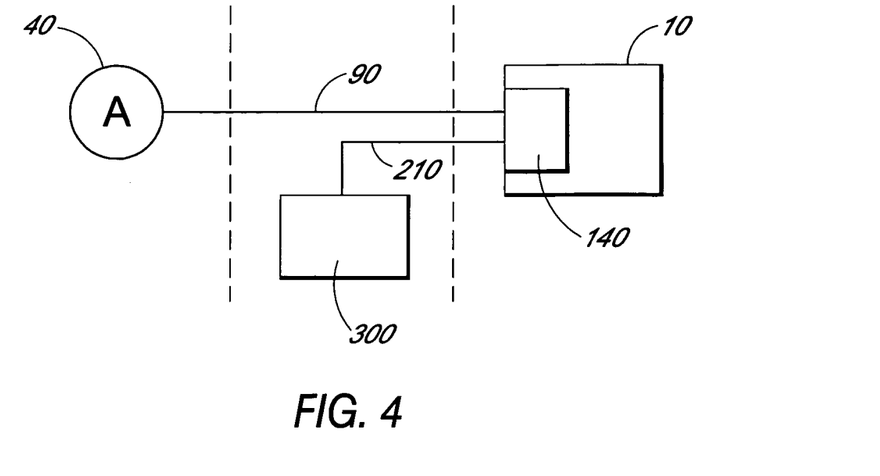
FIG. 4 is a block diagram of an embodiment of a switch comprising connections to a communication line and a power supply.

FIG. 4 is a block diagram of an embodiment of a switch 10 comprising a connection to a Central Office 40 through a communication line 90 and a connection to a power supply 300 via a power supply line 210. The power supply 300 may be provided from an equipment room or a backroom power supply and may be a DC power supply, such as a 24VDC for example, or any other power supply. In this embodiment, the first receptacle 140 may couple Central Office A 40 to the switch 10 via the communication line 90. The first receptacle 140 may also couple the power source 300 to the switch 10 via the power supply line 210.

Figure 5:
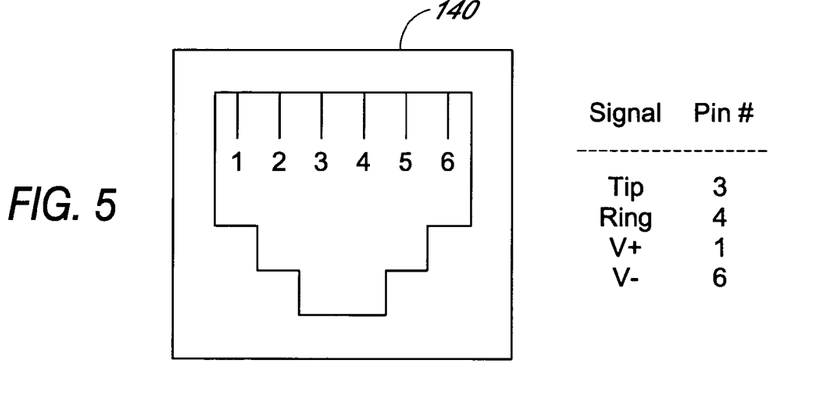
FIG. 5 is a schematic diagram of one embodiment of a modular jack.
Figure 6:
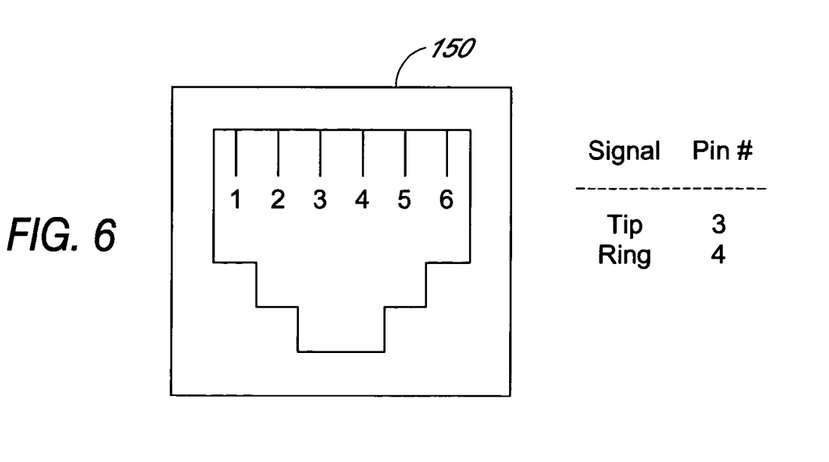
FIG. 6 is a schematic diagram of one embodiment of a modular jack.

As depicted in FIG. 5, an embodiment of the first receptacle 140 (depicted in FIGS. 3 and 4) may be a 6-wire modular jack. This modular jack 140 carries the tip and ring (depicted as pins 3 and 4) from a communication line 90 as well as a plus/minus voltage (depicted as pins 1 and 6) from a DC power supply 300 or any other power supply. As depicted in FIG. 6, an embodiment of the second receptacle 150 (depicted in FIG. 3) may also be a 6-wire modular jack. This modular jack 150 carries a tip and ring (depicted as pins 3 and 4) from another communication line, such as the second communication line 100 (depicted in FIG. 1).

Figure 7:
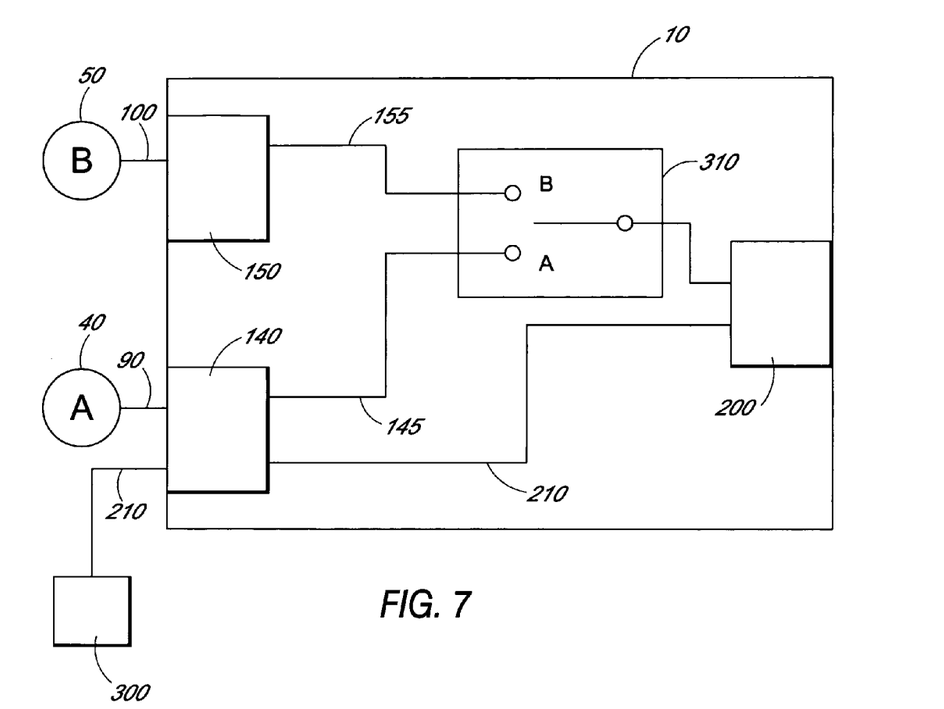
FIG. 7 is a block diagram of an embodiment of a switch comprising connections to multiple communication lines and a power supply.

FIG. 7 is a block diagram of an embodiment of the switch 10, comprising a connection circuitry 310, first and second receptacles 140 and 150 coupled to Central Office A 40 and Central Office B 50 via communication lines 90 and 100, and a third receptacle 200. The switch 10 is also coupled to a power supply 300 via a power supply line 210 that is coupled to the modular jack of the first receptacle 140. In this embodiment, the third receptacle 200 is coupled to the power supply 300 via the power supply line 210 that is coupled to the switch 10. The third receptacle 200 is also coupled though the switch 10 to Central Office A 40 via the first receptacle 140 or to Central Office B 50 via the second receptacle 150, depending upon the connection status of the connection circuitry 310 of the switch 10.

Although some embodiments depict a connection by the switch 10 to one of two Central Offices, such as in FIG. 7, a skilled technologist would also be able to fabricate a switch 10 that connects to a multitude of Central Offices other than the Central Offices A 40 and B 50.

Figure 8:
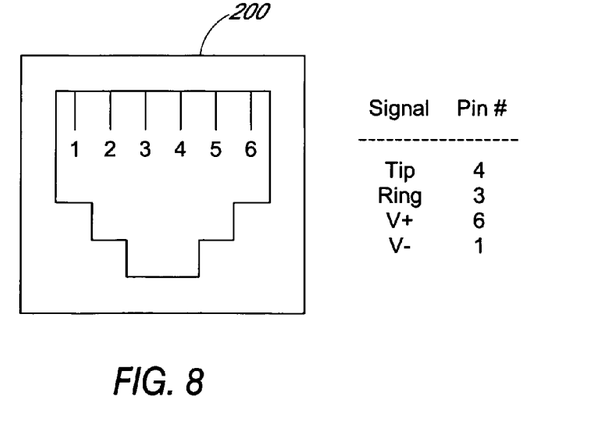
FIG. 8 is a schematic diagram of still another embodiment of a modular jack.

In FIG. 8, an embodiment of the modular jack for the third receptacle 200 is depicted. In the embodiment of FIG. 8 with reference to FIG. 7, the third receptacle 200 comprises a 6-wire modular jack that carries a plus/minus voltage (depicted as pins 6 and 1) from a power supply line 210 that is connected through the modular jack of the first receptacle 140. The modular jack at the third receptacle 200 also carries a tip and ring (depicted as pins 3 and 4) from either the first communication line 90 of Central Office A 40 or the second communication line 100 of Central Office B 50, depending upon the connection status of the connection circuitry 310 of the switch 10.

Although FIGS. 5, 6 and 8 depict modular jack embodiments, which may be standard RJ25C connectors in one embodiment, there are many different ways to communicate between the elements of this communication system. As long as the elements are able to communicate with one another and perform their functions, then the communication system will perform its desired functions.

In other embodiments, the switch 10 is capable of communicating various types of information to the workstation 20 for monitoring, reporting and updating the communication system. Table 1 illustrates an example of how information may flow between the switch 10 and the workstation 20, with one input report generated by the switch 10 for each output report received from the workstation 20:

TABLE 1

| Item | Values | Usage |
|---|---|---|
| Output Report #0, used by the workstation 20 to control the switch 10: | | |
| Switch 10 | 0, 1, 2 | Selects the desired switch position, where: 0 = no change, 1 = A, 2 = B. Note: When the workstation 20 simply wants to obtain the status of the switch 10, the value 0 is used. |
| Tag | 0-255 | A value incremented by the workstation 20 with each message. |
| Input Report #0, used by the workstation 20 to obtain the current status of the switch 10: | | |
| Switch 10 | 0, 1, 2 | Indicates the current state of the switch 10, where: 0 = Unknown, 1 = A, 2 = B. |
| Who | 0, 1, 2 | Indicates if the last activation was requested by the workstation 20 or if the switch 10 was manually activated, where: 0 = Unchanged since power-up, 1 = workstation, 2 = manual. |
| Power | 0, 1 | Indicates the current state of the power supply, where: 0 = power failure, 1 = power good. |
| Tag | 0-255 | Returns the value received from the host. |

With reference to Table 1 and FIG. 1, the switch 10 may be able to monitor and report the health of the power supply 110. In one embodiment, the switch 10 may detect that the power supply 110 is correct or that the power supply 110 is above or below a desired value. The switch 10 may then make a record of the status of the power supply 110, which is then sent to the workstation 20 in the form of the input report #0 illustrated in Table 1. After the workstation 20 receives the power status record from the switch 10, the workstation 20 may generate a signal (not depicted) indicating the power status. For example, the workstation 20 may signal an alarm indicating that the power supply 110 is failing. Similarly, if the switch 10 communicates to the workstation 20 that the power supply 110 is at a desired value, the workstation 20 may generate a message (not depicted) that the power supply 110 is normal or has been restored. In other embodiments, the switch 10 may also communicate the current health of other power supplies, such as the power supply 300 depicted in FIG. 4.

The switch 10 and workstation 20 may also similarly communicate information on the status of the communication lines connected to the switch 10. For example, as illustrated by the output report #0 in Table 1, the workstation 20 may request the status of the switch 10 as to which communication line is currently selected. In one embodiment, the switch 10 may comprise the first and second communication lines 90 and 100 coupled to Central Office A 40 and Central Office B 50 respectively, as depicted in FIG. 1. The switch 10 may then communicate to the workstation 20 the input report #0 from Table 1 containing information as to which communication line is currently active. The input report #0 may also communicate the current health of the active communication line, such as whether it is properly connected to its Central Office.

Figure 9:
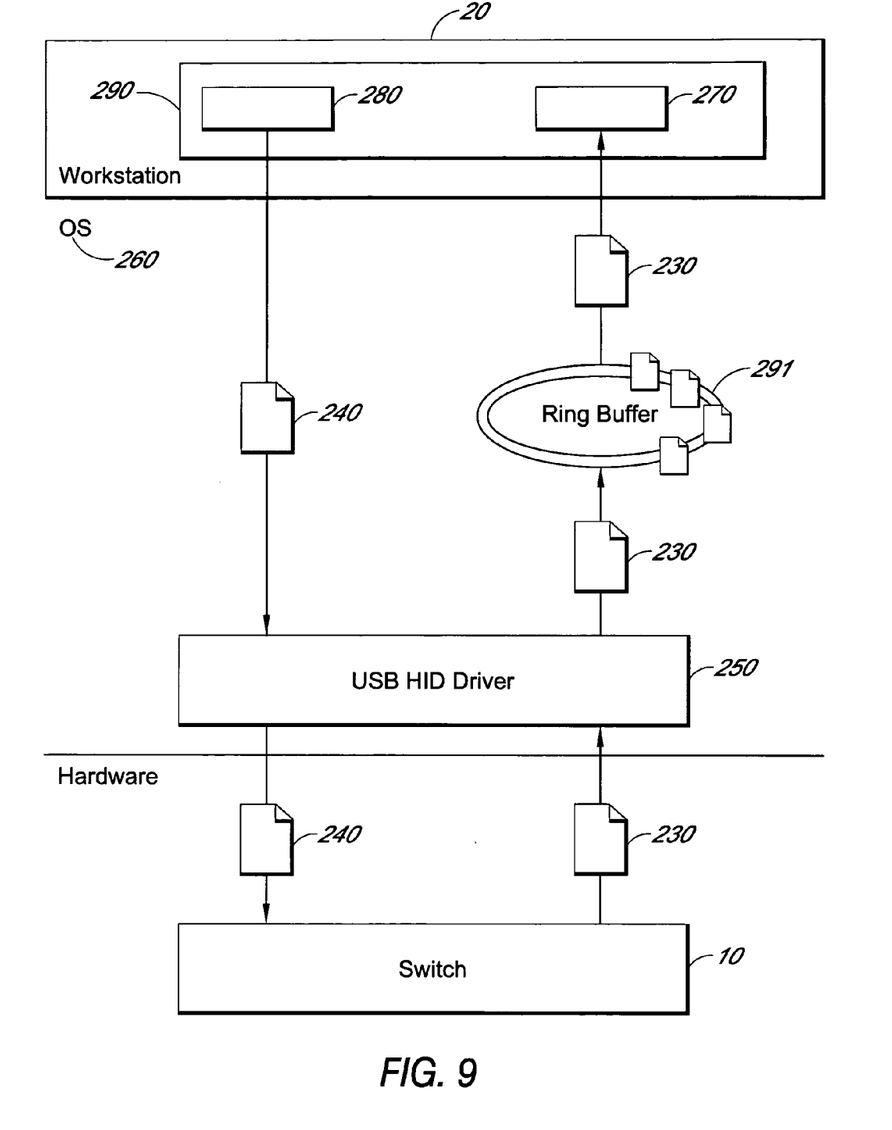
FIG. 9 is a flow diagram illustrating one embodiment of a method of information passing within an embodiment of a communication system.

The flow diagram in FIG. 9 illustrates one embodiment of a method of passing information within an embodiment of a communication system. An embodiment of the switch 10 may be designed to work with a human interface device (HID) class driver 250 supplied by an operating system 260 such as the Windows operating system. This may eliminate the need for a custom driver.

With the use of the HID driver 250, data is exchanged between the switch 10 and the workstation 20 using HID reports. With reference to FIGS. 1 and 9, the workstation 20 may send an output report 240 to the switch 10 through the HID driver 250. This output report 240 may be a programmatic request for the switch 10 to select a particular Central Office, such as Central Office A 40 or Central Office B 50, or it may be a request for the status of either the switch 10 or the power supply 110. This output report 240 results in an input report 230 being generated by the switch 10 to be sent to the workstation 20 through the HID driver 250. During this exchange, the input report 230 from the switch 10 is sent to the workstation 20 where it is provided to an application programming interface (API) (not depicted), which in turn calls an API read file 270. In an exemplary embodiment, the API read file 270 may be part of a CTI application 290 stored in the memory of the workstation 20 that programmatically controls the switch 10 or provides some other service, such as media processing or customer data management. A call to an API read file 270 does not initiate traffic on the communication line 80, which may be a USB, because the API read file 270 is part of the CTI application 290 being processed within the workstation 20. Rather, it generates an API write file 280 that is a product of the API read file 270 input and the CTI application 290 processing. The API write file 280 may then transferred to the switch 10 in the form of an output report 240 for additional programmatic control or status requests. This output report 240 is sent to the switch 10 through the HID driver 250, where the output report 240 may programmatically control the switch 10 by requesting that the switch select Central Office A 40 or Central Office B 50 or that the switch 10 provide another input report 230 regarding current Central Office selection and/or status of the power supply 110.

After receiving the workstation's output report 240, the switch 10 replies by sending an input report 230 to the workstation 20. Input reports are only generated once for each reception of output reports. The task responsible to receive the input report 230 within the workstation 20 is asynchronous from the task responsible to send the output report 240. Therefore, it is possible for multiple input reports to be received by the HID driver without being read by the application. The ring buffer 291 provides momentary storage to hold one or many input reports allowing the application to call the API read file 270 at its earliest convenience, thus preventing input report 230 from being overwritten and lost.

Figure 10:
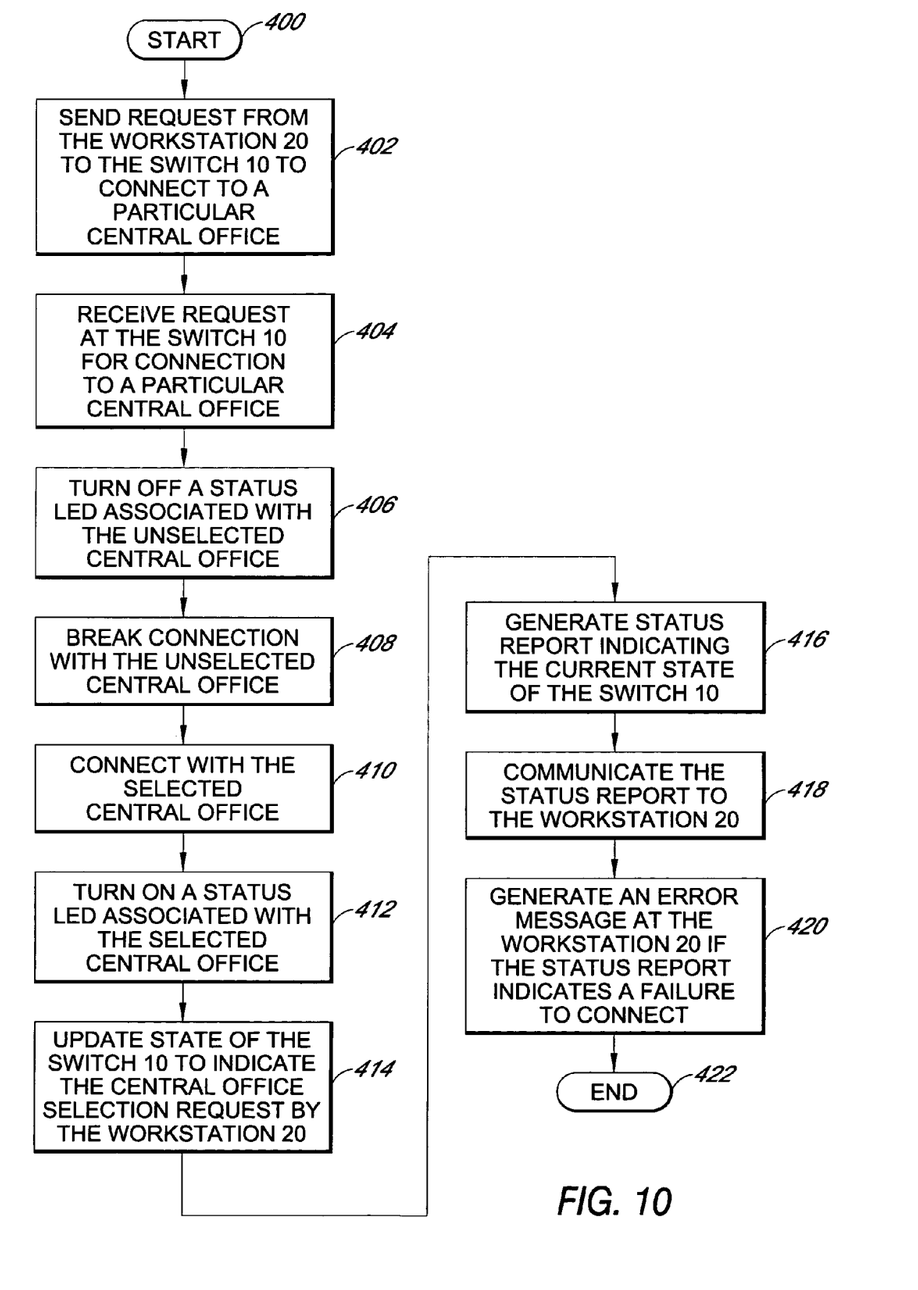
FIG. 10 is a flow chart illustrating one embodiment of a method of programmatic selection of a Central Office in an exemplary communication system.

As for controlling which Central Offices or communication lines are active within the switch 10, there are many options provided in this flexible system. First, in some configurations the switch 10 may be controlled by the workstation 20. FIG. 10 is a flow chart illustrating one embodiment of a method of programmatic selection of a Central Office in an exemplary communication system. More specifically, with reference to FIGS. 1, 2 and 10, workstation 20 in the CTI system 105 programmatically controls the switch 10 to connect to one particular Central Office from among a plurality of Central Offices coupled to the switch 10, such as Central Offices 40 and 50 that are coupled to the switch 10 through the communication lines 90 and 100. The switch 10 then performs a series of steps, not in any particular order, to perform the requested function.

For example, starting at step 400 in FIG. 10, the programmatic selection proceeds to step 402 where the workstation 20 sends a request to the switch 10 to connect to one particular Central Office from among a plurality of Central Offices coupled to the switch 10. The switch 10 receives the request from the workstation 20 at step 404, and then at step 406 the switch turns off a status LED, such as the LEDs 120 or 130 depicted in FIG. 2, associated with the unselected Central Office. At step 408 the switch 10 breaks the connection on the unselected Central Office and corresponding communication line and applies a 900 Ohm termination to that unselected Central Office and corresponding communication line. Conversely, at step 410 the switch 10 removes a 900 Ohm termination from the selected Central Office and corresponding communication line and makes a connection to the selected Central Office and corresponding communication line. The switch 10 then turns on a status LED associated with the selected Central Office at step 412, thereby visually indicating the selected Central Office. The switch 10 updates its state at step 414 to identify the chosen Central Office and to indicate that it was most recently activated by the workstation 20. The switch 10 then generates a status report at step 416 that indicates the current state of the switch 10, and the status report is communicated to the workstation 20 at step 418. The workstation 20 receives the status report sent by the switch 10 and the workstation 20 may generate an error message at step 420 if the status report indicates a failure to connect to the selected Central Office or if there are other problems in completing the connection. The exemplary programmatic selection illustrated by FIG. 10 then ends at step 422. If there is a problem completing the connection to the selected Central Office by programmatic control of the switch 10 by the workstation 20, a user may manually select a Central Office with the toggle switch 200.

Figure 11:
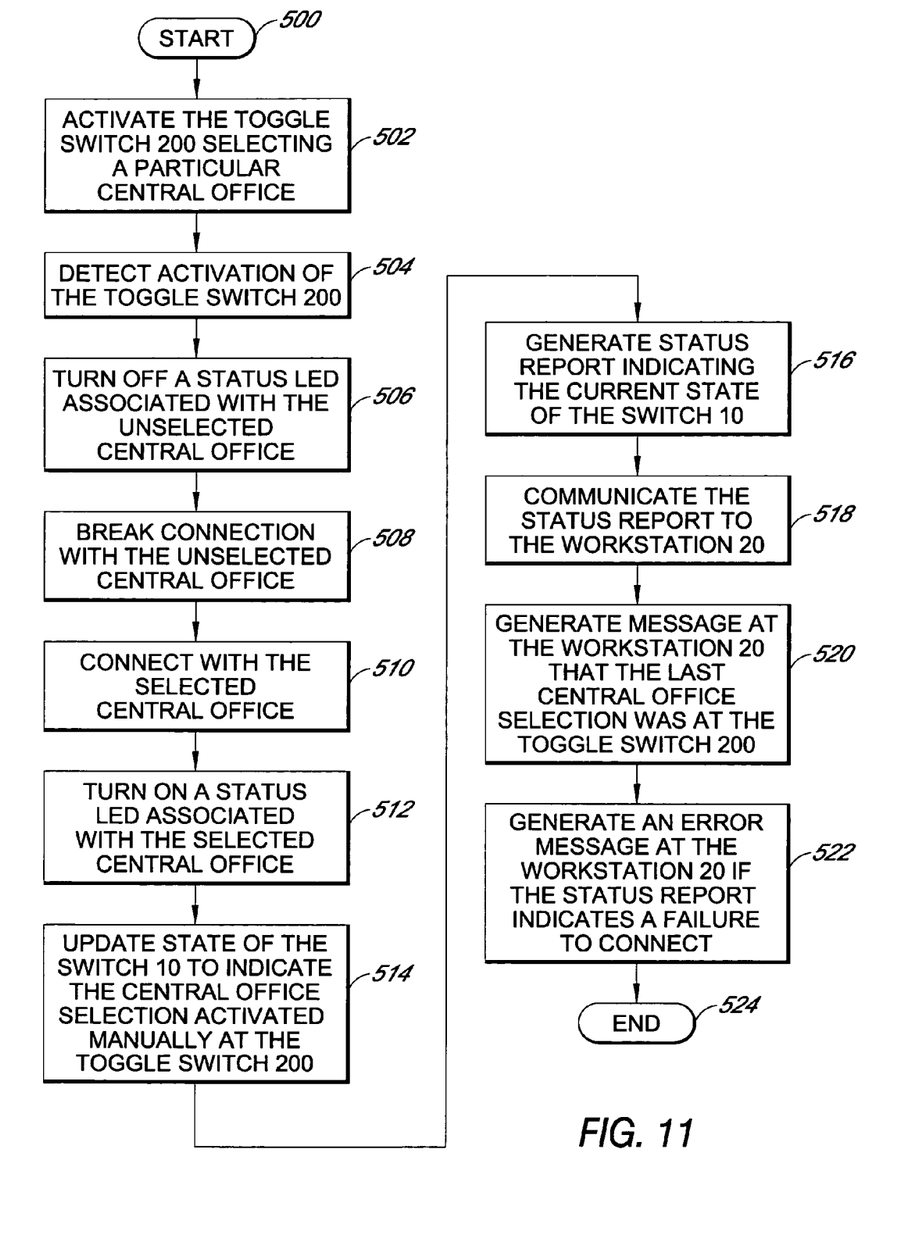
FIG. 11 is a flow chart illustrating one embodiment of a method of manual selection of a Central Office in an exemplary communication system.

In addition to programmatic control of the switch 10 by a workstation 20, a user may also manually instruct the switch 10 to connect to a particular Central Office and its corresponding communication line. A flow chart illustrating a method of operation of an exemplary communication system with manual selection is shown in FIG. 11. With reference to FIGS. 1, 2 and 11, a user (not depicted) activates the toggle switch 200 selecting a Central Office from a plurality of Central Offices, including Central Office A 40 or Central Office B 50. In response to this manual activation, the switch 10 performs a series of functions, not necessarily in any particular order.

For example, starting at step 500 in FIG. 11, the manual selection proceeds to step 502 where the user activates the toggle switch 200 thereby selecting for connection one particular Central Office from among a plurality of Central Offices coupled to the switch 10. The switch 10 detects the manual activation of the toggle switch 200 at step 504, and then at step 506 the switch turns off a status LED, such as the LEDs 120 or 130 depicted in FIG. 2, associated with the unselected Central Office. At step 508 the switch 10 breaks the connection on the unselected Central Office and corresponding communication line and applies a 900 Ohm termination to that unselected Central Office and corresponding communication line. Conversely, at step 510 the switch 10 removes a 900 Ohm termination from the selected Central Office and corresponding communication line and makes a connection to the selected Central Office and corresponding communication line. The switch 10 then turns on a status LED associated with the selected Central Office at step 512, thereby visually indicating the selected Central Office. The switch 10 updates its state at step 514 to identify the chosen Central Office and to indicate that it was most recently activated by a manual selection at the toggle switch 200. The switch 10 then generates a status report at step 516 that indicates the current state of the switch 10, and the status report is communicated to the workstation 20 at step 518. The workstation 20 receives the status report sent by the switch 10 and the workstation 20 generates a message at step 520 that the last Central Office selection was at the toggle switch 200. The workstation 20 may also generate an error message at step 522 if the status report indicates a failure to connect to the selected Central Office or if there are other problems in completing the connection. The exemplary programmatic selection illustrated by FIG. 10 then ends at step 524.

Resulting from the exemplary methods of operation illustrated in FIGS. 10 and 11, in the event of a power outage or if the switch 10 hardware resets or reboots, the previously selected communication line will continue to be the selected communication line within the switch 10. This is because the last activation of a Central Office will result in a 900 Ohm termination on the unselected Central Office and corresponding communication line with an absence of a 900 Ohm termination on the selected Central Office and corresponding communication line until there is another Central Office and corresponding communication line selected either manually through the toggle switch 200 or programmatically through the CTI system 105 or workstation 20.

In the embodiments illustrated by the exemplary methods of operation in FIGS. 10 and 11, the 900 Ohm termination may include a resistance and capacitance. In one embodiment, for example in FIG. 5, the resistance and capacitance may be a 900 Ohm resistance in series with a 2.2 uF capacitor capable of withstanding a high voltage, such as 100VDC, between the Tip signal and a Ring signal (depicted as pins 3 and 4). It is understood, however, that one of reasonable skill in the art will be able to define several different types of termination.

The communication lines 90 and 100 from Central Office A 40 and B 50 both normally expect a communication device, such as communication device 30, to be attached to the end of the communication line, as depicted in FIG. 1. Because the switch 10 causes one of the two communication lines 90 or 100 to be disconnected from the communication device 30, the open-ended communication line 90 or 100 may be affected by transient noise and other interfering signals and may cause the unselected Central Office to detect false transmission errors. To reduce the risk of false transmission errors, a termination of 900 Ohm is connected to the unused communication line 90 or 100 to closely simulate the impedance that would normally be provided by the communication device 30 if it was connected to the line. In one embodiment, the communication device 30 is a Meridian Business Set telephone instrument with a normal termination of documented by Nortel as 900 Ohms and 2.2 uF.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the components illustrated may be made by those skilled in the art, without departing from the spirit or essential characteristics of the invention.

What is claimed is:

1. A computer-telephony integration (CTI) system for selectively allowing communication of a workstation with one of a plurality of Central Offices, the CTI system comprising:
    a computer-telephony integration (CTI) system including one or more workstations;
    a switch coupled to the workstations and to the plurality of Central Offices, wherein the switch is configured to provide a connection between one of the CTI workstations and a selected one of the plurality of Central Offices in response to a command from a CTI workstation;
    wherein the switch is coupled to each of the one or more CTI workstations and the connection between one of the CTI workstations and a selected one of the plurality of Central Offices is in response to a command from said one CTI workstation;
    wherein the switch is configured to shunt a connection between a communication device coupled to said one CTI workstation and one or more of the Central Offices; and
    wherein the connection is shunted by a resistance of about 900 Ohms.

2. The apparatus of claim 1, wherein one or more of the Central Offices each comprises a public exchange system.

3. A computer-telephony integration (CTI) system for selectively allowing communication of a workstation with one of a plurality of Central Offices, the CTI system comprising:
    a computer-telephony integration (CTI) system including one or more workstations; and
    a switch coupled to the workstations and to the plurality of Central Offices, wherein the switch is configured to provide a connection between one of the CTI workstations and a selected one of the plurality of Central Offices in response to a command from a CTI workstation, wherein the switch and the workstation are electronically coupled via a universal serial bus.

4. The apparatus of claim 3, wherein the switch is configured to communicate a status report to the particular CTI workstation, wherein the status report indicates which of the plurality of Central Offices are connected to the particular CTI workstation.

5. The apparatus of claim 4, further comprising a power source providing power to the switch and wherein the status report further comprises a status of the power supply.

6. The apparatus of claim 3, further comprising a manually controlled switch configured to provide a communication path between said one of the CTI workstations and the selected one of the plurality of Central Offices in response to a command from a user.

7. The apparatus of claim 3, wherein there are two Central Offices.

8. The apparatus of claim 3, wherein each of the one or more CTI workstations comprises a communication device and wherein the switch is further configured to provide a connection between a communication device of any one of the CTI workstations and a selected one of the plurality of Central Offices in response to a command from the particular CTI workstation.

9. A method of controlling communication within a computer-telephony integration (CTI) system comprising:
    receiving a request within the CTI system for connection to a particular Central Office selected from among a plurality of Central Offices;
    transmitting a command from the CTI system to a switch, wherein the command indicates the particular Central Office;
    providing a connection between the CTI system and the particular Central Office through the switch in response to the command from the CTI system;
    sending a communication report from the switch to the CTI system, the communication report comprising a status report of the connection between the CTI system and the particular Central Office; and
    transmitting an amount of power into the switch and wherein the communication report further comprises a status of the amount of power.

10. The method of claim 9, further comprising manually operating the switch to select the particular Central Office from among the plurality of Central Offices, and providing a connection between the CTI system and the particular Central Office in response to the manual operation.

11. A method of controlling communication within a computer-telephony integration (CTI) system comprising:
    receiving a request within the CTI system for connection to a particular Central Office selected from among a plurality of Central Offices;
    transmitting a command from the CTI system to a switch, wherein the command indicates the particular Central Office;
    providing a connection between the CTI system and the particular Central Office through the switch in response to the command from the CTI system;
    wherein the act of transmitting a command comprises sending a command from a workstation in the CTI system to the switch; and
    wherein the workstation programmatically controls the switch by communicating through a universal serial bus.

12. The method of claim 11, wherein the CTI system comprises one or more CTI workstations and wherein the switch is configured to provide a connection to any one of the CTI workstations and the selected Central Office.

13. The method of claim 11, wherein there are two Central Offices.

14. The method of claim 11, wherein the CTI system comprises one or more CTI workstations each comprising a communication device and wherein the switch is further configured to provide a connection between a communication device of one of the CTI workstations and a selected one of the plurality of Central Offices in response to a command from the particular CTI workstation.

15. An apparatus for controlling communication within a computer-telephony integration (CTI) system comprising:
   means for receiving a request in the CTI system for connection to a particular Central Office selected from among a plurality of Central Offices;
   means for transmitting a command from the CTI system to a switch, wherein the command indicates the particular Central Office;
   means for providing a connection between the CTI system and the particular Central Office through the switch in response to the command from the CTI system;
   wherein the means for transmitting a command further comprises means for sending a command from a workstation in the CTI system to the switch; and
   wherein the workstation comprises means for programmatically controlling the switch by communicating through a universal serial bus.

16. A method of controlling communication within a computer-telephony integration (CTI) system comprising:
   receiving a request transmitted through a communication line coupled to the CTI system, wherein the request is for connection to one Central Office selected from among a plurality of Central Offices coupled to the CTI system;
   transmitting a command from the CTI system to a switch through a universal serial bus, wherein the command indicates the request for connection to the one Central Office;
   providing a connection between the CTI system and the one Central Office through the switch in response to the command from the CTI system; and
   sending a communication report from the switch to the CTI system through the universal serial bus, wherein the communication report comprises a status report of the connection between the CTI system and the one Central Office.

17. The method of claim 16, further comprising manually operating the switch to select a Central Office from among the plurality of Central Offices, thereby connecting the CTI system to said one of the Central Offices.

18. The method of claim 16, wherein the CTI system comprises one or more CTI workstations each comprising a communication device and wherein the switch is further configured to provide a connection between a communication device of any particular one of the CTI workstations and a selected one of the plurality of Central Offices in response to a command from the particular CTI workstation.

* * * * *